(12) United States Patent
McKeever et al.

(10) Patent No.: US 11,677,239 B2
(45) Date of Patent: Jun. 13, 2023

(54) CONTROLLING THE ELECTRICAL LOAD OF A LOAD FACILITY USING DEMAND RESPONSE

(71) Applicant: Trane International Inc., Davidson, NC (US)

(72) Inventors: James Kenneth McKeever, Blaine, MN (US); Udhaya Kumar Dayalan, Lino Lakes, MN (US); Thomas C. Basterash, East Bethel, MN (US)

(73) Assignee: Trane International Inc., Davidson, NC (US)

( * ) Notice: Subject to any disclaimer, the term of this patent is extended or adjusted under 35 U.S.C. 154(b) by 203 days.

(21) Appl. No.: 17/145,945

(22) Filed: Jan. 11, 2021

(65) Prior Publication Data

US 2022/0224114 A1    Jul. 14, 2022

(51) Int. Cl.
| | |
|---|---|
| *H02J 1/10* | (2006.01) |
| *H02J 13/00* | (2006.01) |
| *H02J 3/14* | (2006.01) |
| *G05F 1/66* | (2006.01) |
| *H02J 3/06* | (2006.01) |

(52) U.S. Cl.
CPC ............... *H02J 1/109* (2020.01); *G05F 1/66* (2013.01); *H02J 3/06* (2013.01); *H02J 3/144* (2020.01); *H02J 13/00001* (2020.01)

(58) Field of Classification Search
CPC .. H02J 3/00001; H02J 3/06; H02J 3/14; H02J 3/144; H02J 1/109; H02J 3/381; H02J 13/00001; H02J 13/00028; G05F 1/66; G06Q 10/063; G06Q 10/631; G06Q 10/6315; G06Q 30/0202; G06Q 50/06
See application file for complete search history.

(56) References Cited

U.S. PATENT DOCUMENTS

| | | | | |
|---|---|---|---|---|
| 5,962,989 | A | 10/1999 | Baker | |
| 8,412,654 | B2 | 4/2013 | Montalvo | |
| 8,626,354 | B2 * | 1/2014 | Walter | G06Q 50/06 |
| | | | | 700/297 |
| 8,630,744 | B2 | 1/2014 | Walter et al. | |
| 9,153,001 | B2 * | 10/2015 | Walter | G06Q 50/06 |

(Continued)

FOREIGN PATENT DOCUMENTS

CA         2140559 C     10/2007

*Primary Examiner* — Crystal J Barnes-Bullock
(74) *Attorney, Agent, or Firm* — Womble Bond Dickinson (US) LLP

(57) ABSTRACT

A method is provided for controlling electrical load on a power grid from a load facility using demand response. The method includes accessing memory storing computer-readable program code for decision analysis of a specified time interval for a demand-response (DR) event. The method also includes executing the computer-readable program code, via a processor, to cause an apparatus to at least make a decision to participate in or opt out of the DR event. This includes the apparatus receiving values of variables that describe occupancy and usage of the load facility for one or more time intervals. The apparatus applies the values to an algorithm that maps the variables to a decision to participate in or opt out of the DR event for the specified time interval. And the apparatus automatically notifies an operator responsible for the DR event of the decision at least when the decision is to opt out.

18 Claims, 15 Drawing Sheets

(56) References Cited

U.S. PATENT DOCUMENTS

| | | | |
|---|---|---|---|
| 9,997,914 B2 | 6/2018 | Day et al. | |
| 10,110,002 B2 | 10/2018 | Imhof et al. | |
| 10,241,528 B1* | 3/2019 | Frader-Thompson | ... F24F 11/80 |
| 10,467,639 B2 | 11/2019 | McCurnin et al. | |
| 11,073,849 B1* | 7/2021 | Frader-Thompson | ........................ G05D 23/1917 |
| 11,255,562 B2* | 2/2022 | Ho | ........................ F24F 11/86 |
| 2012/0029897 A1 | 2/2012 | Cherian et al. | |
| 2015/0019032 A1 | 1/2015 | Koch et al. | |
| 2015/0170171 A1 | 6/2015 | McCurnin et al. | |
| 2016/0181807 A1 | 6/2016 | Day et al. | |
| 2017/0169525 A1 | 6/2017 | Mokhtari et al. | |
| 2018/0316221 A1 | 11/2018 | Dutta et al. | |
| 2018/0331539 A1 | 11/2018 | Lee | |
| 2019/0140446 A1 | 5/2019 | Day et al. | |
| 2019/0249895 A1* | 8/2019 | Weyant | ............. H02J 13/00022 |
| 2021/0123771 A1* | 4/2021 | Vega | ...................... G01D 4/004 |

\* cited by examiner

RESOURCE-AVAILABILITY SCHEDULE

| MONDAY | TUESDAY | WEDNESDAY | THURSDAY | FRIDAY |
|---|---|---|---|---|
| 90 KW AVAILABLE | 40 KW AVAILABLE | 10 KW AVAILABLE | 40 KW AVAILABLE | 65 KW AVAILABLE |
| RESOURCE #1 – 25 KW (OFFICE LIGHTS) | RESOURCE #3 – 10 KW (PARKING LOT LIGHTS) | RESOURCE #3 – 10 KW (PARKING LOT LIGHTS) | RESOURCE #3 – 10 KW (PARKING LOT LIGHTS) | RESOURCE #6 – 20 KW (TURRET PUNCH) |
| RESOURCE #2 – 25 KW (OFFICE HVAC ROOFTOPS) | RESOURCE #4 – 10 KW (MARQUE LIGHTS & FOUNTAINS) | | RESOURCE #4 – 10 KW (MARQUE LIGHTS & FOUNTAINS) | RESOURCE #7 – 20 KW (MANUFACTURING HVAC ROOFTOPS) |
| RESOURCE #3 – 10 KW (PARKING LOT LIGHTS) | RESOURCE #5 – 10 KW (AUDITORIUM) | | RESOURCE #5 – 10 KW (AUDITORIUM) | RESOURCE #8 – 10 KW (PRESS BRAKE) |
| RESOURCE #4 – 10 KW (MARQUE LIGHTS & FOUNTAINS) | RESOURCE #9 – 10 KW (COMMON SPACE HVAC) | | RESOURCE #9 – 10 KW (COMMON SPACE HVAC) | RESOURCE #10 – 15 KW (WELDING STATIONS) |
| RESOURCE #5 – 10 KW (AUDITORIUM) | | | | |
| RESOURCE #9 – 10 KW (COMMON SPACE HVAC) | | | | |

FIG. 3B

CONTROLLING THE ELECTRICAL LOAD OF A LOAD FACILITY USING DEMAND RESPONSE

TECHNOLOGICAL FIELD

The present disclosure relates generally to demand-response control of an electrical load of a load facility, and in particular, controlling the electrical load facility using demand response in which a decision to participate in or opt out of a demand-response event is based on occupancy and usage of the load facility.

BACKGROUND

Electrical generating utilities generally negotiate production requirements with regional transmission organizations and independent system, transmission, or distribution system operators. These system operators are responsible for the operation of the electrical transmission system, commonly known as the power grid. System operators use a variety of techniques, collectively known as load balancing, to match power generation capabilities to demand. One load-balancing technique that is gaining widespread acceptance is known as demand-response. Demand-response is the practice of incentivizing consumers of electricity to change their electrical usage patterns by reducing loads and by time-shifting use from periods of overall high grid demand to periods where grid demand is lower. Similarly, consumers may be incentivized to increase demand during periods of high supply and low demand. In return, electrical consumers may be compensated such as by reduced electrical rates or earned incentive payments.

The electric power industry considers demand-response (DR) programs to be an increasingly valuable asset. In traditional DR programs, capacity is a factor of the total amount of electrical load "aggregated" into a portfolio. The entity in control of this portfolio has the right to dispatch these resources to produce a desired impact on the grid, such as a curtailment or increase in electric load.

DR resources often impose some form of sacrifice on a user. For example, a call to curtail load could result in a reduction in office lighting level, an increase in air conditioning temperature set points in a retail establishment, or the suspension of operation of an industrial process. Impacts of sacrifice-type curtailment may be harmful or even catastrophic to the primary mission of the affected facility. Because of these negative impacts, customers who have signed up to participate in a DR load control program may not actually participate when called. That is, when a DR event request is dispatched to load facilities participating in a DR program, the load facilities will respond unless the users opt out of the called DR event. This may be particularly true when variables such as weather conditions force system operators to call for a DR event multiple days in a row. In some DR programs, users may be allotted a certain number of opt-outs over a time interval such as a year, before the users start to lose the incentives of participating in the program.

BRIEF SUMMARY

Example implementations provide improved methods of controlling electrical load on a power grid from a load facility using demand response. According to some example implementations of the present disclosure, resources of the load facility may be assigned respective amounts of electric power that are capable of being shed (to reduce demand) or consumed (to increase demand) by the resources during a demand-response (DR) event. An initial resource-availability schedule may be produced that indicates what of the resources are available to participate in a DR event over a time interval, subinterval by subinterval. The resource-availability schedules may be adjusted responsive to user input, and used to produce a second and further resource-availability schedules that may include predictions of the available resources; and over time, the resource-availability schedules may become more accurate, with less user input.

According to some example implementations, a system operator may periodically request participation in a DR event for a specified time interval or subinterval. A resource-availability schedule for the specified time interval or subinterval may be used to automatically make a decision to participate in or opt out of the DR event, with little to no user input; and the system operator may be notified of the decision. In some examples, the system operator may be further notified of a level of participation when the amount of electric power available to be shed is less than a load shed associated with the DR event. By using resource availability, the level of participation may be automatically determined for any given time interval or subinterval.

In some examples, prior DR event data such as requests, weather conditions, occupancy and use, or the like may be used to predict a specified time interval or subinterval for a future request for a DR event. Example implementations may then identify resource availability for the specified time interval/subinterval, and preemptively notify the system operator as to a decision to participate in or opt out (and perhaps a level of partial participation if supported). The system operator may use this information to better prepare for potential DR shed events, making sure enough participants and resources are available to meet the potential event.

The present disclosure thus includes, without limitation, the following example implementations.

Some example implementations provide a method of controlling electrical load on a power grid from a load facility using demand response, the load facility including a plurality of resources with respective amounts of electric power that are capable of being shed by the plurality of resources during a demand-response (DR) event, the method comprising: accessing memory storing computer-readable program code for decision analysis of a specified time interval for the DR event; and executing the computer-readable program code, via a processor, to cause an apparatus to at least make a decision to participate in or opt out of the DR event, including the apparatus at least: accessing values of variables that describe occupancy and usage of the load facility for one or more time intervals, the variables correlated with the electrical load of the load facility for the one or more time intervals; selecting a subset of the plurality of resources that are available to participate in the DR event for the specified time interval based on the values of the variables; and controlling the electrical load of the load facility for the specified time interval based on the subset of the plurality of resources.

Some example implementations provide a method of controlling electrical load on a power grid from a load facility using demand response, the method comprising: accessing memory storing computer-readable program code for decision analysis of a specified time interval for a DR event; and executing the computer-readable program code, via a processor, to cause an apparatus to at least make a decision to participate in or opt out of the DR event, including the apparatus at least: receiving values of variables that describe occupancy and usage of the load facility for one or more time intervals, the variables correlated with the electrical load of the load facility for the one or more time intervals; applying the values to an algorithm that maps the variables to the decision to participate in or opt out of the DR event for the specified time interval; and automatically notifying an operator responsible for the DR event of the decision at least when the decision is to opt out.

Some example implementations provide an apparatus for controlling electrical load on a power grid from a load facility using demand response, the apparatus comprising a memory configured to store computer-readable program code for decision analysis of a specified time interval for a DR event; and a processor configured to access the memory, and execute the computer-readable program code to cause the apparatus to at least make a decision to participate in or opt out of the DR event, according to the method of any preceding example implementation, or any combination of any preceding example implementations.

Some example implementations provide a computer-readable storage medium for controlling electrical load on a power grid from a load facility using demand response, the computer-readable storage medium being non-transitory and having computer-readable program code stored therein that, in response to execution by a processor, causes an apparatus to at least make a decision to participate in or opt out of the DR event, according to the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3A and 3B illustrate a plurality of resources and a resource-availability schedule for a specified time interval of one week that includes subintervals of days, according to some example implementations;

DETAILED DESCRIPTION

Figure 1:
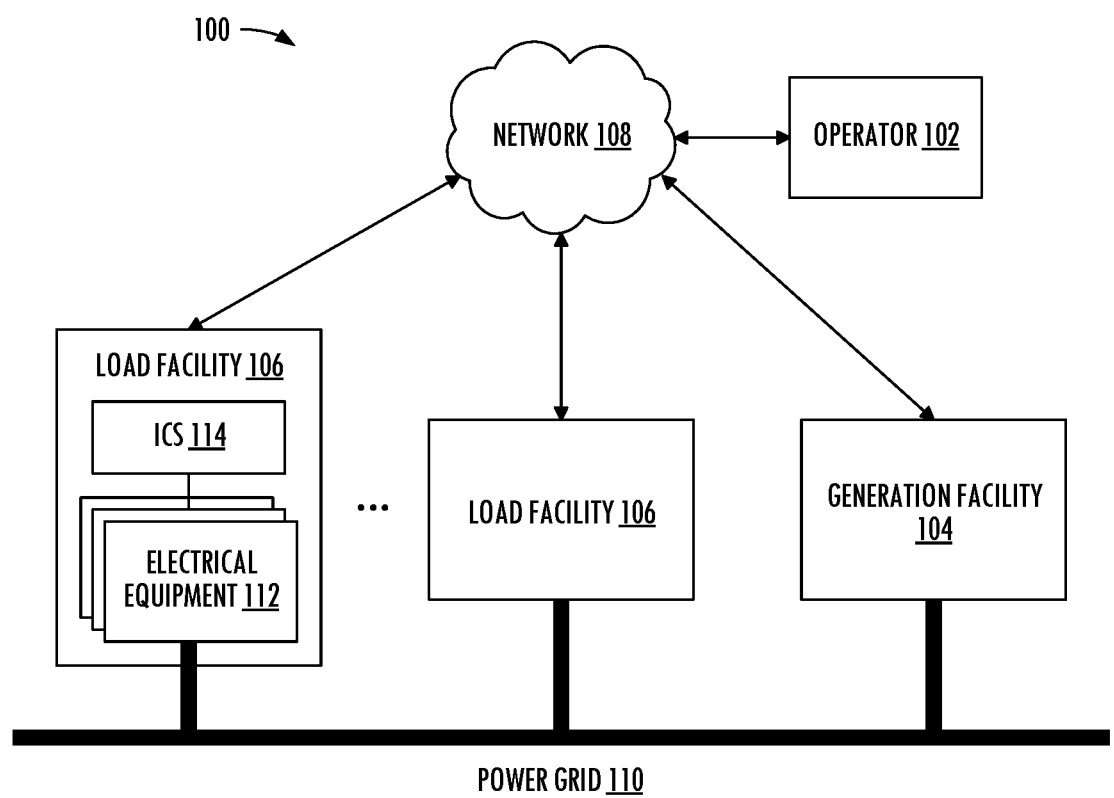
FIG. 1 illustrates an electric transmission and distribution system according to various example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

As indicated above, example implementations of the present disclosure are directed to demand-response control of an electrical load of a load facility in which a decision to participate in or opt out of a demand-response event is based on occupancy and usage of the load facility, and perhaps also weather. FIG. 1 illustrates an electric transmission and distribution (T&D) system 100 according to various example implementations of the present disclosure. As shown, the T&D system includes at least one system operator (at times more simply referred to as an operator 102). In various examples, the operator may be an independent system operator (ISO), transmission system operator (TSO), distribution system operator (DSO) or the like. The operator is in operable communication with at least one generation facility 104 and at least one load facility 106. In some examples, the operator, load facility and/or generation facility may communicate with one another across one or more networks 108 such as one or more telecommunications networks, computer networks or the like. In this regard, the system operator, load facility and/or generation facility may be wired or wirelessly coupled to the one or more networks.

The operator 102 may be configured to coordinate, control and monitor a power grid 110 (at times referred to as a T&D grid), including the transmission and/or distribution of electric power on the power grid. The generation facility 104 is configured to contribute power into the power grid through which power is delivered to the load facilities 106. The load facilities are generally facilities configured to draw power from the power grid. The load facilities include any consumer of electrical power, such as industrial facilities, institutional facilities, commercial facilities, residential facilities and the like. In some examples, the load facilities include buildings such as industrial buildings, institutional buildings, commercial buildings, residential buildings and the like. Even further, examples of suitable commercial buildings include office buildings, warehouses, retail buildings and the like.

As also shown, at least one load facility 106 includes electrical equipment 112 powered from power drawn from the power grid 110 by the load facilities. The electrical equipment may include, for example, mechanical, electrical, lighting, shading, access control, security systems and the like. As another example, the electrical equipment may include a heating, ventilation and air conditioning (HVAC) system and associated components such as air handling units, variable air volume (VAV) units, compressors, air movers, chillers, furnaces, and ventilators. The load facility also includes an industrial control system (ICS) 114 such as a supervisory control and data acquisition (SCADA) system, distributed control system (DCS) or the like. A more specific example of a suitable DCS is a building automation system (BAS). The ICS is configured to provide some level of computerized central control of at least some of the electrical equipment within the load facility 106.

Figure 2:
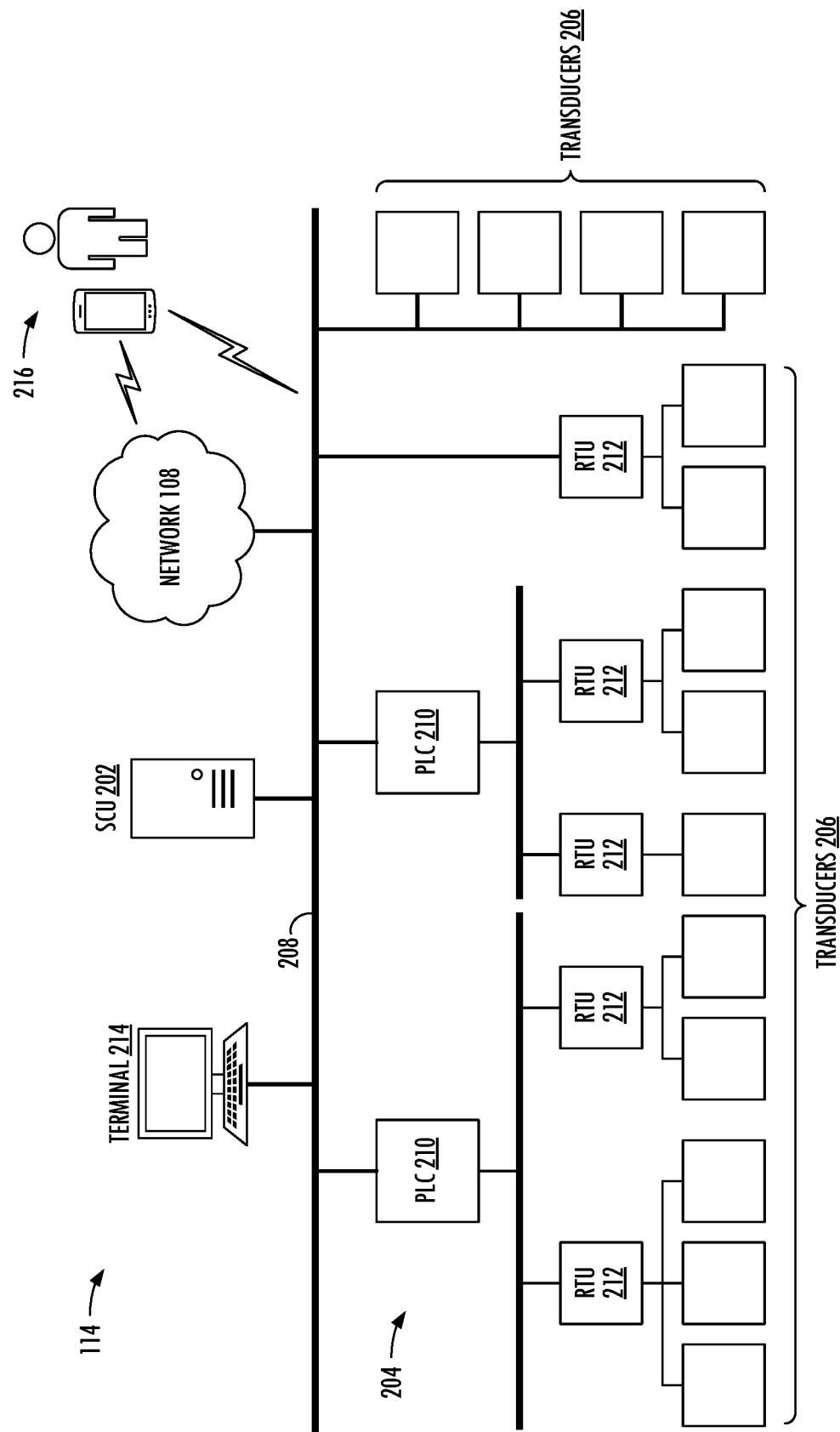
FIG. 2 illustrates an industrial control system for a load facility, according to some example implementations.

FIG. 2 more particularly illustrates the ICS 114 according to some example implementations. As shown, the ICS includes the supervisory control unit (SCU) 202 configured to enable communication with and/or control of the electrical equipment 112, such as by wired or wireless data links directly or across one or more networks. The ICS includes field connection units 204 to enable the SCU to communicate with the electrical equipment, and in particular transducers 206 including actuators and/or sensors in the load facility 106, some of which may be onboard the electrical equipment.

The SCU 202 and the field connection units 204 may communicate by wired or wireless data links directly or across one or more networks, such as a control network 208. Examples of suitable communication protocols for the control network include TCP/IP, BACnet, LonTalk, Modbus, ZigBee, Zwave, Wi-Fi, SIMPLE, Bluetooth and the like. The control network may also be coupled to the one or more networks 108.

In some examples, the SCU 202 may be implemented as a supervisory computer, and the respective field connection units may be implemented as programmable logic controllers (PLCs) 210, remote terminal units (RTUs) 212, or some combination of PLCs and RTUs. The SCU may further communicate with a terminal 214 configured to provide a human-machine interface (HMI) to the SCU. The SCU may be integrated, co-located, or communicate with one or more of the field connection units and/or transducers 206 by wired or wireless data links directly or across the control network.

A load-facility operator may access the ICS 114 in a number of different manners, such as via the terminal 214. As also shown, a load-facility operator 216 may access the ICS from a user device such as a mobile device, handheld computer or the like. The user device may be configured to access the ICS from the control network 208 via a local wireless connection to the control network, or through the one or more networks 108.

The SCU 202 is configured to communicate with the transducers 206 for communication and/or control of the load facility 106 and the electrical equipment 112, such as to enable the SCU to control mechanical, electrical, lighting, shading, access control, security systems, HVAC system and associated components such as air handling units, VAV units, compressors, air movers, chillers, furnaces, air purifiers and ventilators, and the like. In some particular examples, the transducers may include one or more actuators configured to control operation of electrical equipment. The transducers may also include one or more environmental sensors such as temperature sensors, humidity sensors, gas sensors like $CO_2$ sensors, occupancy sensors and the like.

According to example implementations of the present disclosure, the SCU 202 may be configured to control electrical load on the power grid 110 from the load facility 106 using demand response. The load facility includes a plurality of resources with respective amounts of electric power that are capable of being shed by the plurality of resources during a demand-response (DR) event to reduce demand on the power grid. Similarly, the load facility may include one or more resources with respective amounts of electric power that are capable of being consumed by the one or more resources during a demand-response (DR) event to increase demand on the power grid during a period of high supply. These amounts may be expressed in a number of different manners, such as in kilowatts (kW). The plurality of resources includes measures for modifying demand (reducing or increasing) on the power grid from electrical equipment 112 for a time interval, or otherwise modifying power consumption of the electrical equipment.

In the case of a DR event to reduce demand on the power grid 110, the resources may include, for example, temporarily reducing or interrupting power consumption of electrical equipment 112, shifting power consumption to another time interval, and using onsite power generation or storage instead of the power grid. Resources in the case of a DR event to increase demand on the power grid may include, for example, temporarily increasing power consumption of electrical equipment, shifting power consumption from another time interval such as by enabling additional electrical equipment, shifting the efficiency of electrical equipment to consume more power, and operating electrical equipment to generate energy (e.g., electrical, thermal) for onsite storage. A resource, then, may refer to electrical equipment and a measure to modify (reduce or increase) its power consumption.

The SCU 202 is configured to perform a decision analysis of a specified time interval for the DR event, and make a decision to participate in or opt out of the DR event. In this regard, the SCU is configured to access values of variables that describe occupancy and usage of the load facility 106 for one or more time intervals. The variables correlated with the electrical load of the load facility for the one or more time intervals. The SCU is configured to select a subset of the plurality of resources that are available to participate in the DR event for the specified time interval based on the values of the variables; and in some examples, the SCU is configured to select one or more but less than all of the plurality of resources. The SCU is configured to control the electrical load of the load facility for the specified time interval based on the subset of the plurality of resources.

In some examples, the SCU 202 configured to select the subset of the plurality of resources includes the SCU configured to apply the values to an algorithm that maps the variables to the subset of the plurality of resources that are selected. In some examples, the algorithm that is implemented as a stochastic algorithm such as a machine learning algorithm. In other examples, the algorithm that is implemented as a deterministic algorithm.

The SCU 202 may initially rely on input from the load-facility operator 216 to select the subset of the plurality of resources that are available to participate in the DR event. The algorithm may be produced and evolve over time to automatically select the subset with less if any user input. Even in these cases, the SCU may still be directed to notify the load-facility operator of the subset of the plurality of resources that are selected, as the load-facility operator is not making the selection. In some of these examples, the SCU may receive confirmation of the selection from the load-facility operator, and proceed with the selection only after the selection is confirmed. Or the load-facility operator may override the selection one or more of the plurality of resources, and/or add one or more resources to the selection.

In some examples, the specified time interval includes a plurality of time subintervals. In some of these examples, the SCU 202 configured to make the decision further includes the SCU configured to produce a resource-availability schedule that identifies the subset of the plurality of resources for the specified time period subinterval by subinterval. In some of these examples, the SCU is configured to control the electrical load for the specified time interval based on the resource-availability schedule.

Figure 3A:
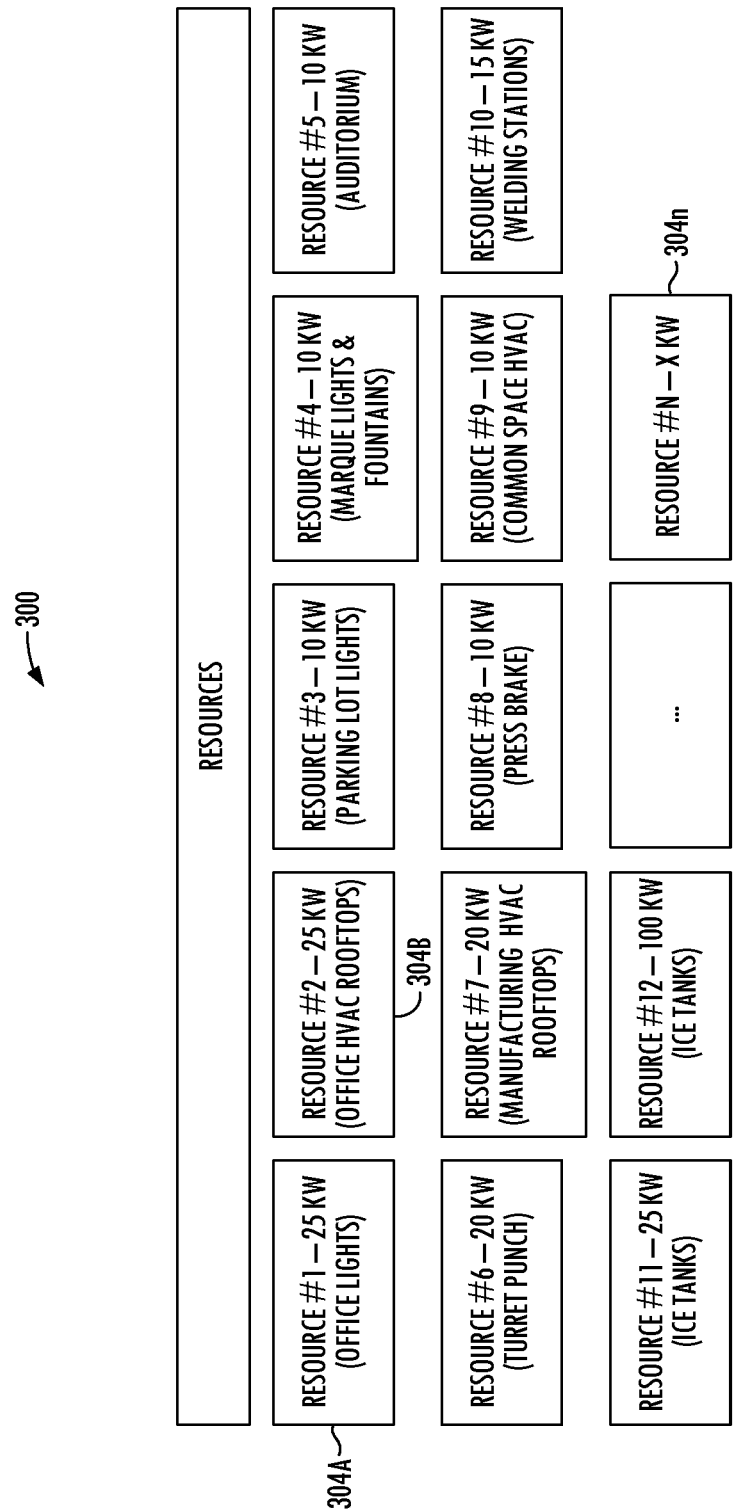

FIGS. 3A and 3B illustrate a plurality of resources 300 and a resource-availability schedule 302 for a specified time interval of one week that includes subintervals of days, according to some example implementations. In other examples, the time interval may span multiple weeks or even months. The plurality of resources may be provided in a resource pool that includes individual resources 304A, 304B, ... 304n with respective amounts of electric power that are capable of being shed or consumed by the plurality of resources during a DR event. As shown, those resources identified as Resource #1-Resource #10 are capable of shedding electric power during a DR event to reduce demand on the power grid 110, while Resource #11 and Resource #11 are capable of consuming electric power during a DR event to increase demand on the power grid.

The resource-availability schedule 302 identifies the subset of the plurality of resources that are available to participate in a DR event for the specified seven-day time period, day by day. As shown, the resource-availability schedule includes multiple days 306; and on each day, the subset of the plurality of resources 308A, 308B, 308C, ... 308n identified as being available to participate in a DR event for the day. For each of the days, the resource-availability schedule identifies the amount 310 of electric power available to be shed by the load facility during the DR event, which may be calculated from those of the respective amounts of electric power for the subset of the plurality of resources.

The resource-availability schedule 302 identifies the subset of the plurality of resources that are available to participate in a DR event to reduce demand on the power grid 110. The same or another resource-availability schedule may similarly include a subset of resources identified as being available to participate in a DR event to increase demand on the power grid. In this case, the resource-availability schedule may identify an amount of electric power available to be consumed by the load facility during the DR event, which may be calculated from those of the respective amounts of electric power for the resources that are available to consume power during the DR event to increase demand on the power grid.

In the example resource-availability schedule 302 shown in FIG. 3B, Monday is a light office day so office resources are available to participate in a DR event. Tuesday and Thursday are both busy days in the office and in manufacturing so only some resources are available to participate in a DR event. On Wednesday, a customer visit is scheduled so only minimal resources are available to participate. And on Friday, the manufacturing plant is shut down so most manufacturing resources are available. In many cases, benefit of the DR event depends on curtailing electrical use of electrical equipment 112 that would otherwise be adding to the electrical load of the load facility 106. In this regard, when the manufacturing plant is shut down on Friday, making the manufacturing resources available only provides value if those resources would otherwise be in use. In cases in which the resources would otherwise be shut down or on reduced power consumption in recognition of the manufacturing plant shutdown, making those resources available for a DR event may not provide much if any benefit to the DR event.

The subset of the plurality of resources identified by the resource-availability schedule 302 may be adjusted before or during the DR event. This may include, for example, the addition or subtraction of one or more resources, or updating the respective amounts of electric power that are capable of being shed or consumed by one or more of the plurality of resources. In particular, for example, the resource-availability schedule shown in FIG. 3B may be adjusted to remove Resource #9 on Monday, add Resource #9 to Wednesday, or replace Resource #7 with Resource #2 on Friday.

Returning to FIG. 2, in some examples, the SCU 202 is configured to produce a second resource-availability schedule for a second specified time interval after the specified time interval. The second resource-availability schedule includes a prediction of the subset of the plurality of resources for the second time interval, the prediction made based on the resource-availability schedule. The SCU is configured to adjust the second resource-availability schedule responsive to user input, and control the electrical load for the second specified time interval based on the second resource-availability schedule.

In some even further examples, the SCU 202 is configured to produce further resource-availability schedules for further specified time intervals after the second specified time interval. The further resource-availability schedules include respective predictions of the subset of the plurality of resources for the further specified time intervals. The respective predictions are made based on earlier resource-availability schedules as adjusted responsive to user input, and the SCU 202 is configured to control the electrical load for the further specified time intervals based on the further resource-availability schedules.

Figure 4:
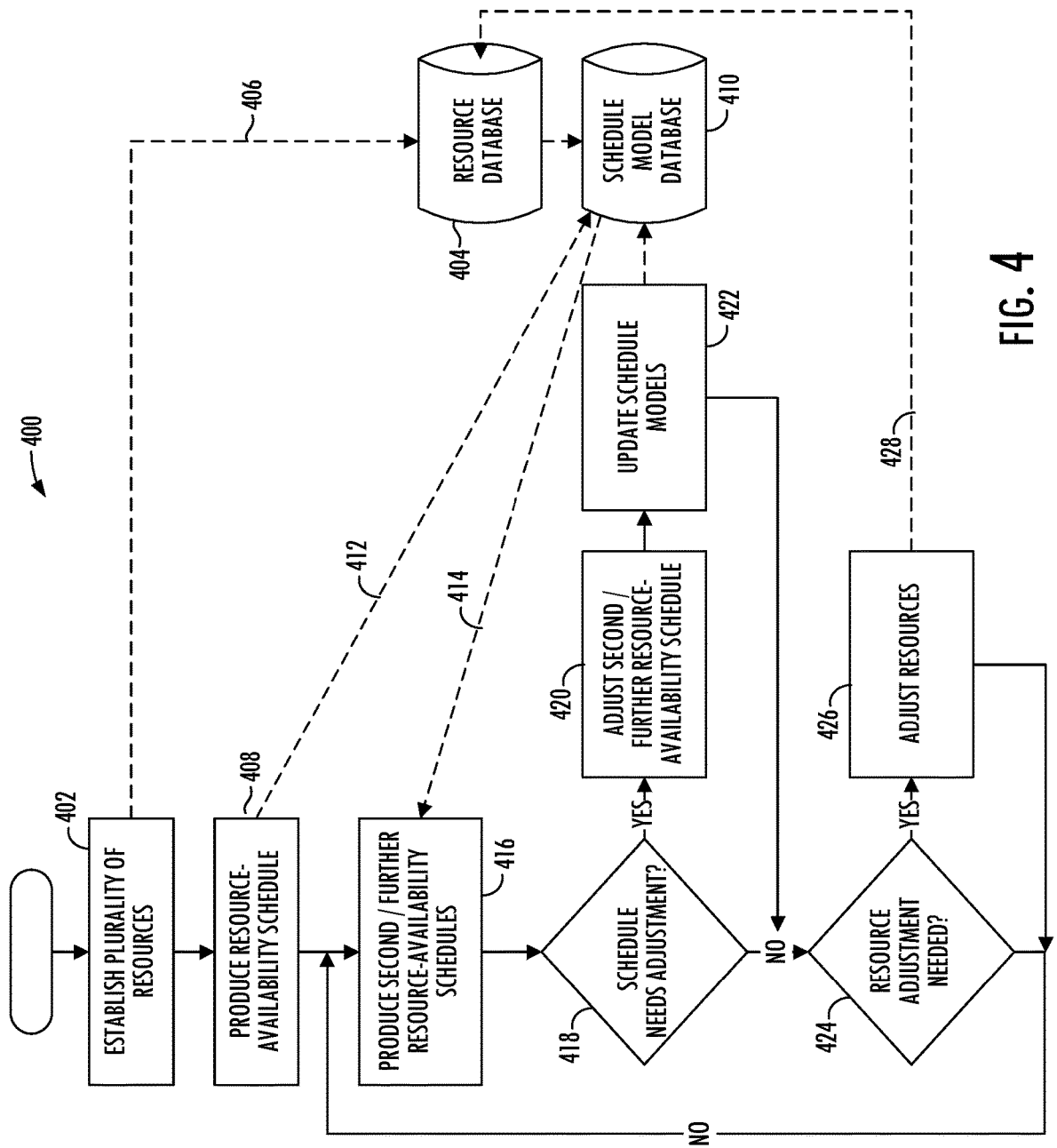
FIG. 4 is a flowchart illustrating various operations in a method of predictive resource scheduling, according to some example implementations.

To further illustrate scheduling available resources, FIG. 4 is a flowchart illustrating various operations in a method 400 of predictive resource scheduling, according to some example implementations. The method includes establishing a plurality of resources of the load facility 106 that are available to participate in a DR event, as shown at block 402. The plurality of resources may be stored in a resource database 404, as shown at 406.

The method 400 includes producing a resource-availability schedule for time subintervals (e.g., days) of a time interval (e.g., week) using the plurality of resources, as shown at block 408. The resource-availability schedule may be produced based on values of variables that describe occupancy and usage of the load facility 106 for one or more time intervals, and perhaps also those that describe weather at a location of the load facility for the one or more time intervals. This resource-availability schedule may be stored in a schedule model database 410, as shown at 412.

The method includes retrieving information from the schedule model database 410, and producing a second and perhaps further resource-availability schedules based on the information, as shown at 414 and block 416. These may be future resource-availability schedules that are predicted or forecasted based on the data from the schedule model database. These future resource-availability schedules may be adjusted responsive to user input, as shown at blocks 418 and 420. The schedule models for the adjusted future resource-availability schedules may then be updated and stored in the schedule model database 410, as shown at block 422.

Similarly, one or more of the plurality of resources may be adjusted, as shown at blocks 424 and 426. This may include, for example, the addition or subtraction of one or more resources, or updating the respective amounts of electric power that are capable of being shed or consumed by one or more of the plurality of resources. These adjustments may be stored in the resource database 404, as shown at 428. At this point, after some delay (e.g., one day), the method 400 again produces further resource-availability schedules may repeat the process repeats again forecasts future resource schedules based on information from the schedule model database 410. As time passes and adjustments are made, the information in the schedule model database may more closely match actual resource availability for each subinterval, with minimal user input.

In addition to determining availability of resources, information may be collected that describes an effective amount of electric power expected to be shed or consumed by each resource during a DR event under forecasted conditions. As the actual effectiveness of each resource may be technically variable and depend on a number of external factors, machine learning and other suitable techniques may be leveraged to not only determine resource availability, but also the estimated amount of electric power that is capable of being shed or consumed by a resource.

In some examples, the plurality of resources may include respective priority values used in the selection of the subset of the plurality of resources. The priority values may be static, dynamic or variable based on one or more factors. In some further examples, the priority values of one or more of the plurality of resources may vary based on day of the week, season, weather or the like. This may allow the load-facility operator 216 to favor some resources over others in their selection for a DR event. In this regard, the load-facility operator may lower priority of turning off parking lot lights during inclement weather.

Again, as indicated above, the respective amounts of electric power that are capable of being shed or consumed by one or more of the plurality of resources may be adjusted or otherwise updated. The respective amount of electric power capable of being shed or consumed by a resource during a DR event may be adjusted in a number of different manners, such as based on the effective or estimated amount of electric power determined based on external factors, machine learning or the like. One example of a suitable technique to monitor performance of a resource is described in U.S. Pat. No. 9,997,914, issued Jun. 12, 2018, the content of which is hereby incorporated by reference.

Returning to FIG. 2, in some examples, the DR event has an associated load shed. In some of these examples, the SCU 202 configured to control the electrical load of the load facility 106 includes the SCU configured to calculate an amount of electric power available to be shed by the load facility during the DR event from those of the respective amounts of electric power for the subset of the plurality of resources. Also in some of these examples, the SCU is configured to make a decision to participate in or opt out of the DR event for the time interval based on a comparison of the amount of electric power available to be shed and the associated load shed for the DR event. In this regard, the SCU is configured to notify the operator 102 responsible for the DR event of the decision at least when the decision is to opt out, if not also when the decision is to participate in the DR event.

In some examples, the SCU 202 may be directed to first notify the load-facility operator 216 of the decision, and notify the operator 102 responsible for the DR event only after the decision is confirmed by the load-facility operator. Or the load-facility operator may override the decision, and the SCU may proceed according to the decision as overridden by the load-facility operator.

According to some example implementations, the SCU 202 is configured to receive values of variables that describe occupancy and usage of the load facility 106 for one or more time intervals, the variables correlated with the electrical load of the load facility for the one or more time intervals. In some examples, the values of the variables that further describe weather at a location of the load facility for the one or more time intervals. Examples of suitable variables that describe the weather include temperature, dew point, heat index, enthalpy and the like.

The values of the variables that describe occupancy and usage, and perhaps also weather, may include at least one of observed values for one or more prior time intervals that are prior to the specified time interval, or predicted values for the specified time interval. In some further examples, then, the values include observed values and predicted values of the variables that describe the occupancy and usage of the load facility, and that further describe the weather at the location of the facility, for the one or more prior time intervals and the specified time interval.

The variables that describe occupancy and usage of the load facility 106 may include any of a number of different variables that correlate with the electrical load of the load facility. In one particular example, the variables may include a people count that describes occupancy and may be used to determine usage for load facilities like office buildings. In this regard, information from a building card access system may be collected and evaluated to determine a number of people in the building for one or more time intervals or subintervals (e.g., days, weeks, months, etc.). This information may be used to establish trends for the time intervals or subintervals with lighter or heavier occupancy levels, with those time intervals or subintervals having lighter occupancy levels being more suited to participation in a DR event.

A related consideration may be the presence of an exception condition in which the load-facility operator 216 may elect to participate in or opt out of a potential DR event based on the presence or absence of a particular event (the exception) related to usage of the load facility 106. Even when usage is low, the exception may push the load-facility operator to opt out of a DR event. In some examples, then, the load-facility operator may elect to participate in a DR event only when expected usage is low and no exceptions are scheduled or otherwise identified.

In another particular example in which the load facility 106 is an industrial facility at which a product is manufactured, historical information (e.g., observed values for one or more prior time intervals) may be used to determine a number of units of the product that are manufactured and/or revenue recorded for a given time interval or subinterval. On corresponding intervals or subintervals with historically high production (facility usage), the facility operator 216 may be more likely to opt out of a DR event. Industrial facilities may forecast production and/or revenue for any of a number of different time intervals or subintervals, and historical and forecasted information may be used to predict the likelihood of the load-facility operator participating in or opting out of a DR event.

In yet other examples, an exception condition may include a scheduled maintenance activity during which the load-facility operator 216 may elect to participate in a DR event. This may include preventative maintenance (PM) events that place electrical equipment 112 or other equipment in the load facility 106 out of service, and therefore reduce the overall consumption of the load facility.

The SCU 202 is configured to apply the values to an algorithm (e.g., stochastic algorithm, deterministic algorithm) that maps the variables to a decision to participate in or opt out of the DR event for the specified time interval. The SCU is configured to automatically notify the operator 102 responsible for the DR event of the decision at least when the decision is to opt out, if not also when the decision is to participate in the DR event. In some examples, the SCU is configured to receive a request to participate in the DR event from the operator, and automatically notify the operator in response to the request.

In some examples such as when the load facility is participating in a DR program that allots a certain number of opt-outs before the load facility starts to lose incentives of participating in the program, the SCU 202 is configured to identify a number of decisions previously made to opt out of prior DR events. In some of these examples, the SCU is configured to notify a load-facility operator 216 when the number of decisions matches or exceeds an allotted number for the load facility 106. The SCU is configured to receive confirmation of the decision from the load-facility operator, and automatically notify the operator 102 only after the decision is confirmed.

In some examples, the plurality of resources of the load facility 106 have respective amounts of electric power that are capable of being shed by the plurality of resources during the DR event. In some of these examples, the SCU 202 is configured to select a subset of the plurality of resources that are available to participate in the DR event for the specified time interval based on the values of the variables, which may be one or more but less than all of the plurality of resources. In some of these examples, the SCU is configured to automatically make the decision to participate in or opt out of the DR event for the specified time interval based on those of the respective amounts of electric power that are capable of being shed by the subset of the plurality of resources.

In particular, in some examples, the DR event has an associated load shed. The SCU 202 is configured to calculate an amount of electric power available to be shed by the load facility 106 from those of the respective amounts of electric power that are capable of being shed by the subset of the plurality of resources. The SCU is then configured to automatically make the decision based on a comparison of the amount of electric power available to be shed by the load facility and the associated load shed for the DR event.

In some examples, the SCU 202 is configured to determine when the operator 102 supports partial participation in the DR event in which the amount of electric power available to be shed by the load facility 106 is less than the associated load shed for the DR event. In some of these examples, the SCU is configured to automatically make the decision to participate in the DR event for the specified time interval; and the SCU is configured to automatically notify the operator of the decision to participate in the DR event, and include the amount of electric power available to be shed by the load facility.

Figure 5:
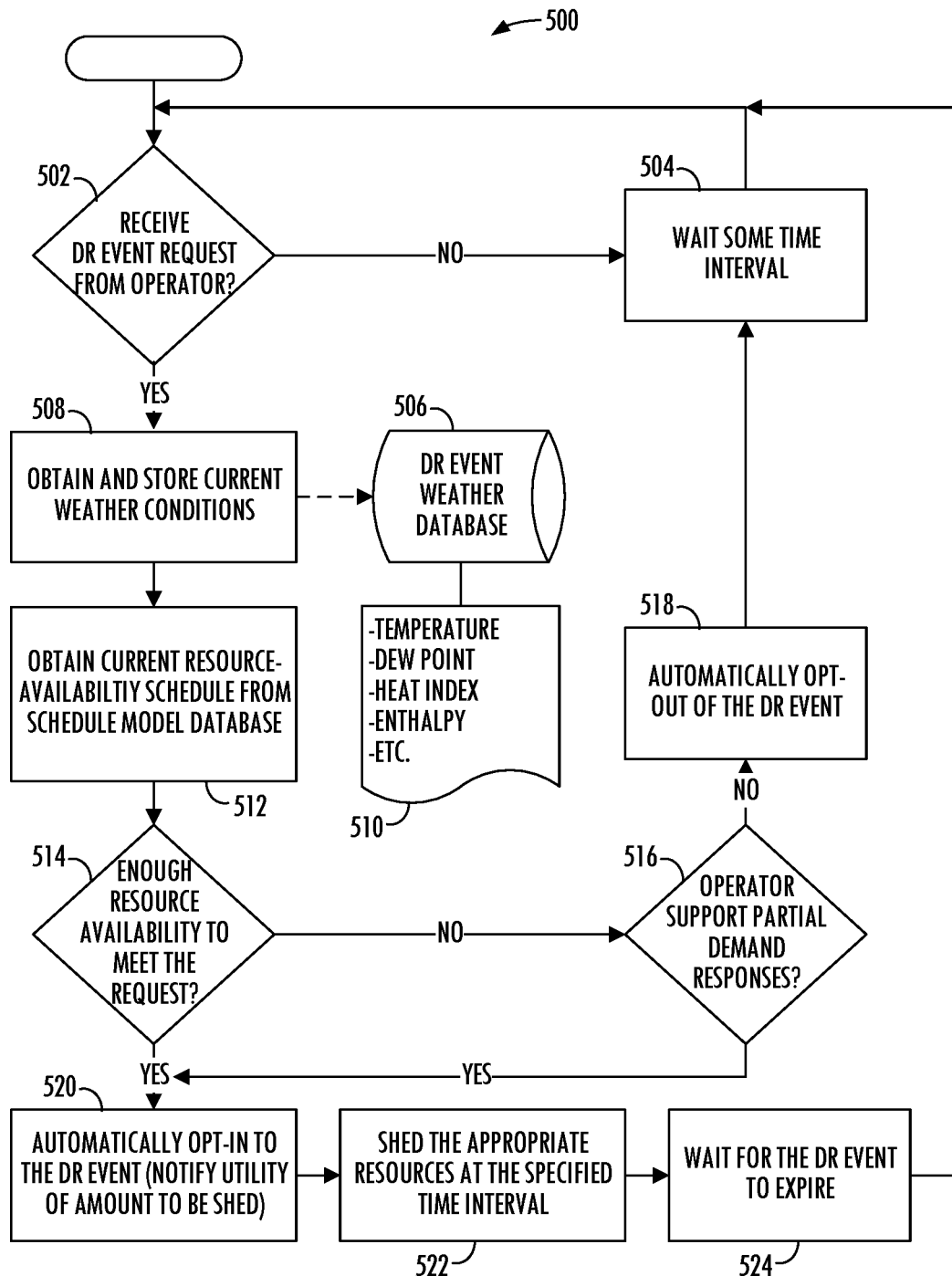
FIG. 5 is a flowchart illustrating various operations in a method of automated demand response, according to some example implementations.

FIG. 5 is a flowchart illustrating various operations in a method 500 of automated demand response, according to some example implementations. The method includes checking that a request to participate in a DR event has been received from the operator 102, as shown at block 502. When a request is not received, the check may be repeated after some time interval such as one day, as shown at block 504.

When a request is received, current weather conditions may be obtained from a weather service, and stored in a DR event weather database 506, as shown at block 508. In some examples, the weather conditions include one or more of outdoor temperature, dew point, heat index, enthalpy and the like, as shown at block 510. The current resource-availability schedule is obtained, such as from the schedule model database 410, as shown at block 512. The amount of electric power available to be shed for the current time subinterval is identified from the current resource-availability schedule, and compared to the associated load shed for the DR event to determine if the amount available meets or exceeds the associated load shed, as shown at block 514.

When the amount available is less than the associated load shed for the DR event, the method 500 includes determining if the operator 102 supports partial participation in the DR event, as shown at block 516. A decision is made to opt out of the DR event, and the operator is automatically notified of the decision, when the operator does not support partial participation, as shown at block 518. The method then waits some interval of time and repeats, checking for receipt of a request for another DR event at block 502.

When the amount available meets or exceeds the associated load shed for the DR event, or the operator 102 supports partial participation, a decision is made to opt in to the DR event, and the operator is notified, as shown at block 520. In the case of a partial participation, the operator is also notified of the amount of electric power available to be shed by the load facility 106. The ICS 114 controls the electrical equipment 112 for the subset of the plurality of resources available to participate for the time subinterval to shed their respective amounts of electric power during the specified time interval of the DR event, until the DR event expires, as shown at blocks 522 and 524. The method 500 then repeats, checking for receipt of a request for another DR event at block 502.

As described above, the operator 102 may be notified of the decision responsive to a request from the operator to participate in a DR event. In other examples, the operator may be notified in anticipation of a DR event, independent of a request. In some examples, then, the SCU 202 is configured to automatically notify the operator independent of a request from the operator to participate in the DR event. In some of these examples in which the values include observed values, the variables further describe decisions previously made to participate in or opt out of any prior DR events during the one or more time intervals. The SCU is configured to apply the observed values to the algorithm that further maps the variables to a prediction of the DR event. The SCU, then, is configured to automatically notify the operator responsive to the prediction, and independent of a request from the operator to participate in the DR event.

Figure 6:
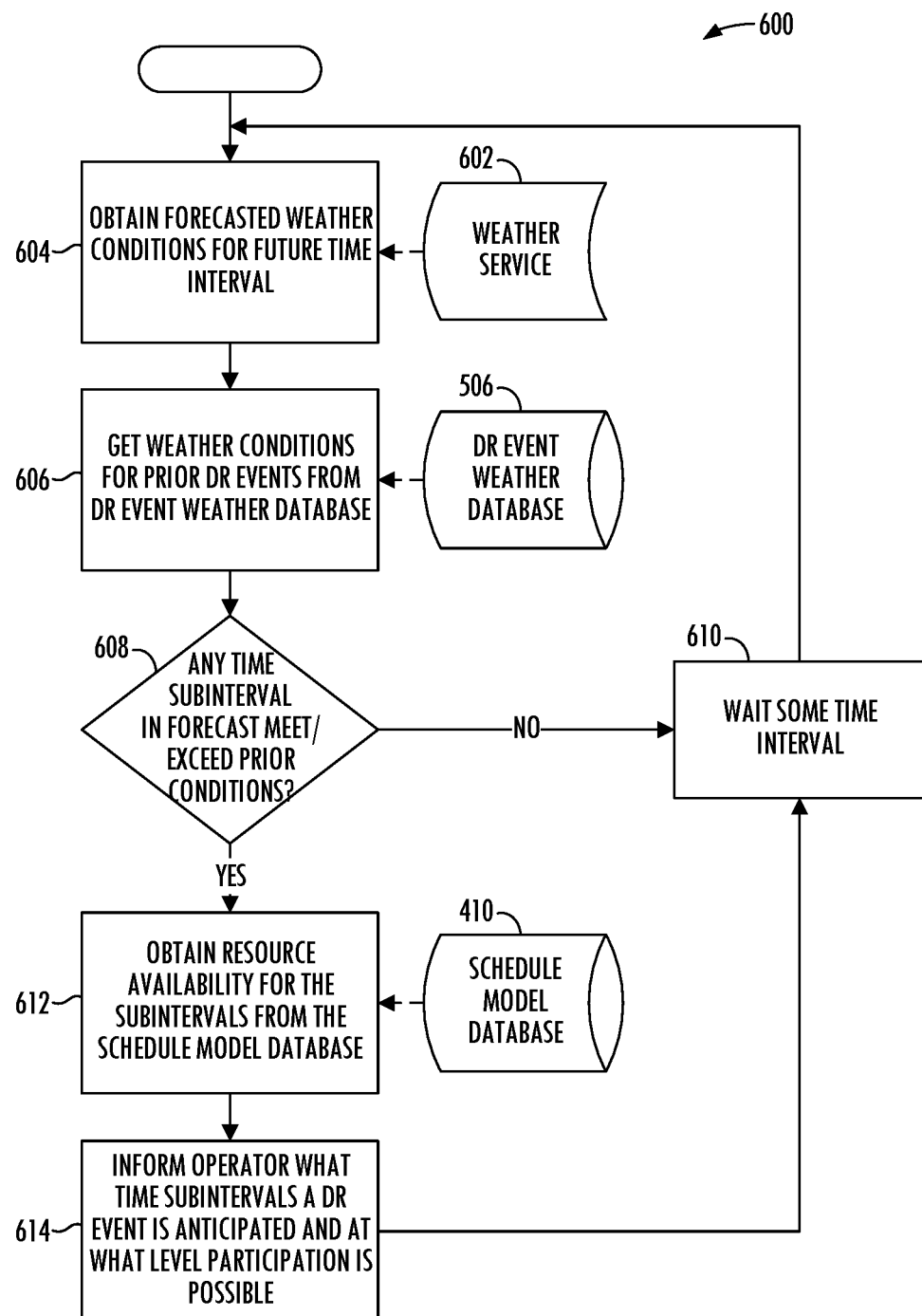
FIG. 6 is a flowchart illustrating various operations in a method of predictive demand response, according to some example implementations.

FIG. 6 is a flowchart illustrating various operations in a method 600 of predictive demand response, according to some example implementations. As shown, the method includes obtaining predicted or otherwise forecasted weather conditions for a future time interval from a weather service 602, as shown at block 604. Observations of prior weather conditions for prior DR events may be obtained from the DR event weather database 506, as shown at block 606. The forecasted weather conditions may be compared to the prior weather conditions for prior DR events to determine if any time subintervals of the future time interval meet or exceed the prior weather conditions, as shown at block 608. When the forecasted weather conditions fail to meet or exceed the prior weather conditions, the method may repeat after some interval of time, as shown at block 610.

A determination if the weather conditions meet or exceed the prior weather conditions may be made in a number of different manners. In some examples, the weather conditions may fail to meet or exceed the prior weather conditions when one or more of the weather conditions such as dry bulb temperature, dew point, heat index or enthalpy are greater than or equal to corresponding ones of the prior weather conditions. Some more sophisticated examples may also consider additional weather conditions such as wind, rain, sunlight intensity and the like. The combination of a number of weather conditions may increase a confidence level in deciding to participate in or opt out of a DR event when the prior weather conditions are considered. The confidence level may also be increased by applying a tolerance, such as +/−3° Fahrenheit for temperature. This may expand those time subintervals the load facility 106 may participate in a DR event, and increase the confidence in the forecast.

When one or more of the time subintervals of the time interval meet or exceed the prior weather conditions for prior DR events, the method 600 may include obtaining the resource-availability schedule for the time interval—and in particular for the one or more time subintervals—from the schedule model database 410, as shown at block 612. The operator then may be automatically notified in advance of what time subintervals the load facility 106 may participate in a DR event and the available level of participation (amount of electric power available to be shed by the load facility), as shown at block 614. The method may then repeat after some time interval, again as shown at block 610.

FIGS. 7A-7E are flowcharts illustrating various steps in a method 700 of controlling electrical load on a power grid 110 from a load facility 106 using demand response, according to various example implementations of the present disclosure. As shown, the method includes accessing memory storing computer-readable program code for decision analysis of a specified time interval for the DR event, as shown at block 702 of FIG. 7A. The method also includes executing the computer-readable program code, via a processor, to cause an apparatus to at least make a decision to participate in or opt out of the DR event, as shown at block 704. This includes the apparatus accessing values of variables that describe occupancy and usage of the load facility for one or more time intervals, the variables correlated with the electrical load of the load facility for the one or more time intervals, as shown at block 706. The apparatus selects a subset of the plurality of resources that are available to participate in the DR event for the specified time interval based on the values of the variables, as shown at block 708. And the apparatus controls the electrical load of the load facility for the specified time interval based on the subset of the plurality of resources, as shown at block 710.

In some examples, selecting the subset of the plurality of resources at block 708 includes selecting one or more but less than all of the plurality of resources.

In some examples, selecting the subset of the plurality of resources at block 708 includes applying the values to an algorithm that maps the variables to the subset of the plurality of resources that are selected, as shown at block 712. In some of these examples, the values are applied to the algorithm that is implemented as a stochastic algorithm such as a machine learning algorithm. In others of these examples, the values are applied to the algorithm that is implemented as a deterministic algorithm.

In some examples, the specified time interval includes a plurality of time subintervals. In some of these examples, the apparatus caused to make the decision further includes the apparatus producing a resource-availability schedule that identifies the subset of the plurality of resources for the specified time period subinterval by subinterval, as shown at block 714 of FIG. 7B. In some of these examples, controlling the electrical load includes controlling the electrical load for the specified time interval based on the resource-availability schedule, as shown at block 710.

Figure 7A:
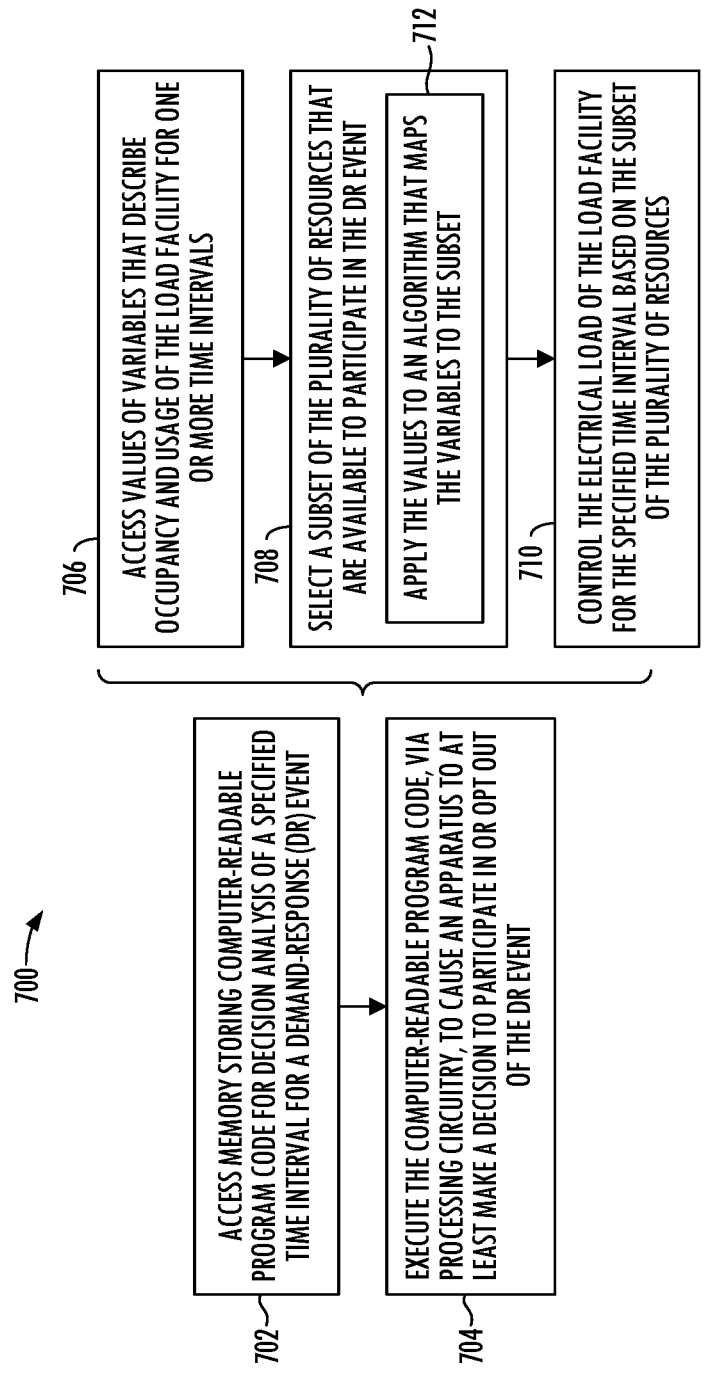
FIGS. 7A, 7B, 7C, 7D and 7E are flowcharts illustrating various steps in a method of controlling electrical load on a power grid from a load facility using demand response, according to various example implementations.
Figure 7B:
Figure 7C:
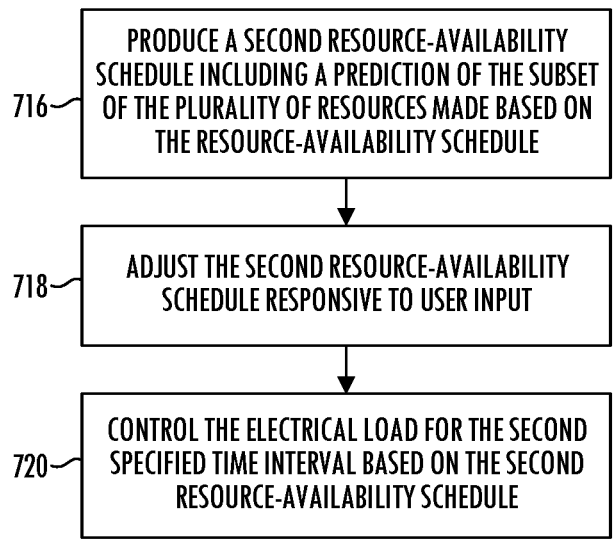

In some examples, the apparatus caused to make the decision further includes the apparatus producing a second resource-availability schedule for a second specified time interval after the specified time interval, as shown at block 716 of FIG. 7C. The second resource-availability schedule includes a prediction of the subset of the plurality of resources for the second time interval, the prediction made based on the resource-availability schedule. The apparatus adjusts the second resource-availability schedule responsive to user input, as shown at block 718. And the apparatus controls the electrical load for the second specified time interval based on the second resource-availability schedule, as shown at block 720.

Figure 7D:
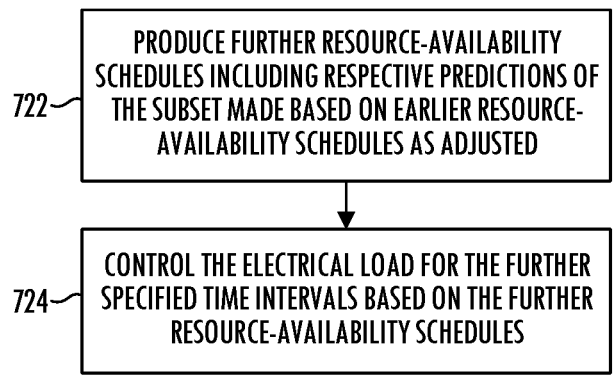
Figure 7E:
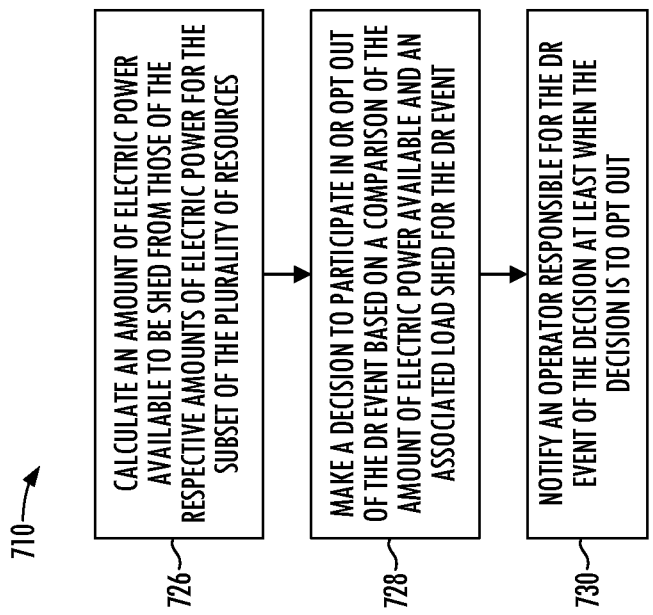

In some examples, the apparatus caused to make the decision further includes the apparatus producing further resource-availability schedules for further specified time intervals after the second specified time interval, as shown at block 722 of FIG. 7D. The further resource-availability schedules include respective predictions of the subset of the plurality of resources for the further specified time intervals. The respective predictions are made based on earlier resource-availability schedules as adjusted responsive to user input. And the apparatus controls the electrical load for the further specified time intervals based on the further resource-availability schedules, as shown at block 724.

In some examples, the DR event has an associated load shed. In some of these examples, controlling the electrical load of the load facility 106 at block 710 includes calculating an amount of electric power available to be shed by the load facility during the DR event from those of the respective amounts of electric power for the subset of the plurality of resources, as shown at block 726 of FIG. 7E. The method includes making a decision to participate in or opt out of the DR event for the time interval based on a comparison of the amount of electric power available to be shed and the associated load shed for the DR event, as shown at block 728. And the method includes notifying an operator 102 responsible for the DR event of the decision at least when the decision is to opt out, as shown at block 730.

FIGS. 8A-8D are flowcharts illustrating various steps in a method 800 of controlling electrical load on a power grid 110 from a load facility 106 using demand response, according to various example implementations of the present disclosure. The method includes accessing memory storing computer-readable program code for decision analysis of a specified time interval for a demand-response (DR) event, as shown at block 802 of FIG. 8A. The method also includes executing the computer-readable program code, via a processor, to cause an apparatus to at least make a decision to participate in or opt out of the DR event, as shown at block 804. This includes the apparatus receiving values of variables that describe occupancy and usage of the load facility for one or more time intervals, the variables correlated with the electrical load of the load facility for the one or more time intervals, as shown at block 806. The apparatus applies the values to an algorithm that maps the variables to a decision to participate in or opt out of the DR event for the specified time interval, as shown at block 808. And the apparatus automatically notifies an operator 102 responsible for the DR event of the decision at least when the decision is to opt out, as shown at block 810.

In some examples, receiving the values of the variables at block 806 includes receiving the values of the variables that further describe weather at a location of the load facility 106 for the one or more time intervals. In some further examples, the values are applied to the algorithm that is implemented as a stochastic algorithm such as a machine learning algorithm. In other further examples, the values are applied to the algorithm that is implemented as a deterministic algorithm.

In some examples, the method 800 further includes receiving a request to participate in the DR event from the operator 102, as shown at block 812. In some of these examples, automatically notifying the operator at block 810 includes automatically notifying the operator in response to the request.

In some examples, the values include at least one of observed values for one or more prior time intervals that are prior to the specified time interval, or predicted values for the specified time interval. In some further examples, receiving the values of the variables at block 806 includes receiving the values of the variables that further describe weather at a location of the load facility 106 for the one or more time intervals. Also in some of these examples, the values include the observed values and the predicted values of the variables that describe the occupancy and usage of the load facility, and that further describe the weather at the location of the facility, for the one or more prior time intervals and the specified time interval.

In some examples, the values include the observed values, the variables further describe decisions previously made to participate in or opt out of any prior DR events during the one or more time intervals, and the observed values are applied to the algorithm that further maps the variables to a prediction of the DR event. In some of these examples, automatically notifying the operator 102 at block 810 includes automatically notifying the operator responsive to the prediction, and independent of a request from the operator to participate in the DR event.

Figure 8A:
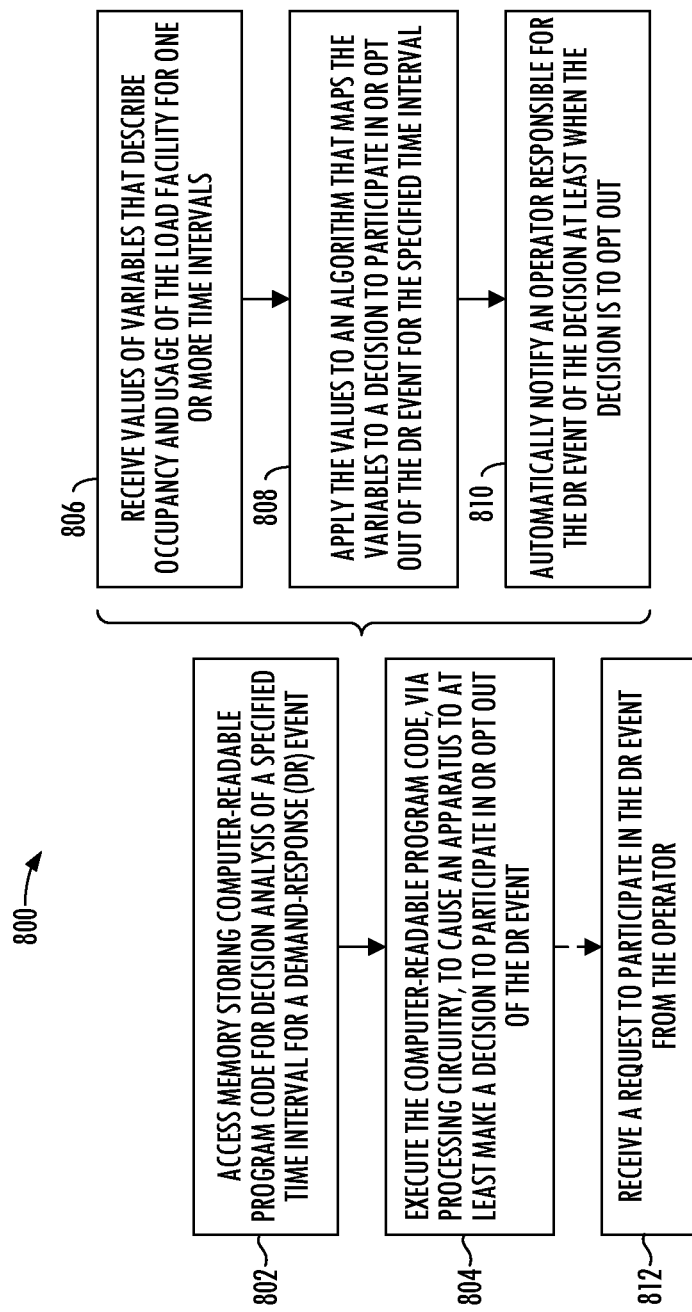
FIGS. 8A, 8B, 8C and 8D are flowcharts illustrating various steps in another method of controlling electrical load on a power grid from a load facility using demand response, according to various example implementations.
Figure 8B:
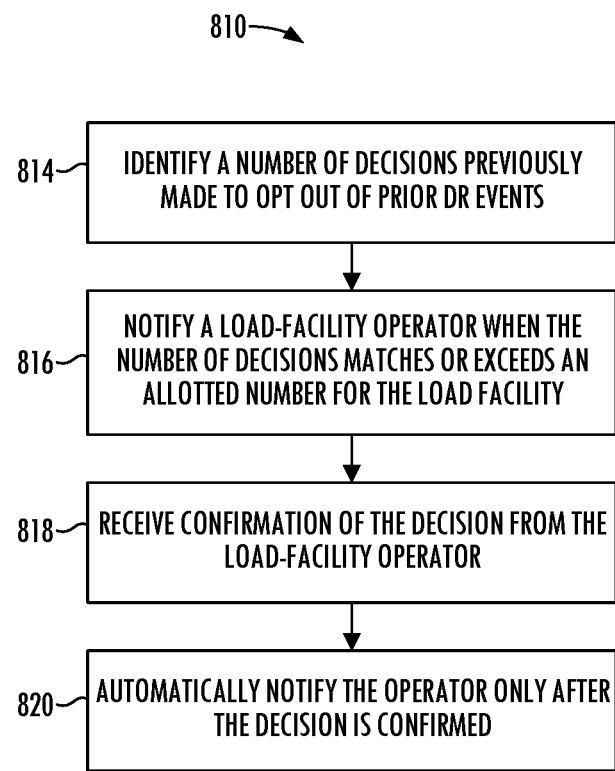
Figure 8C:
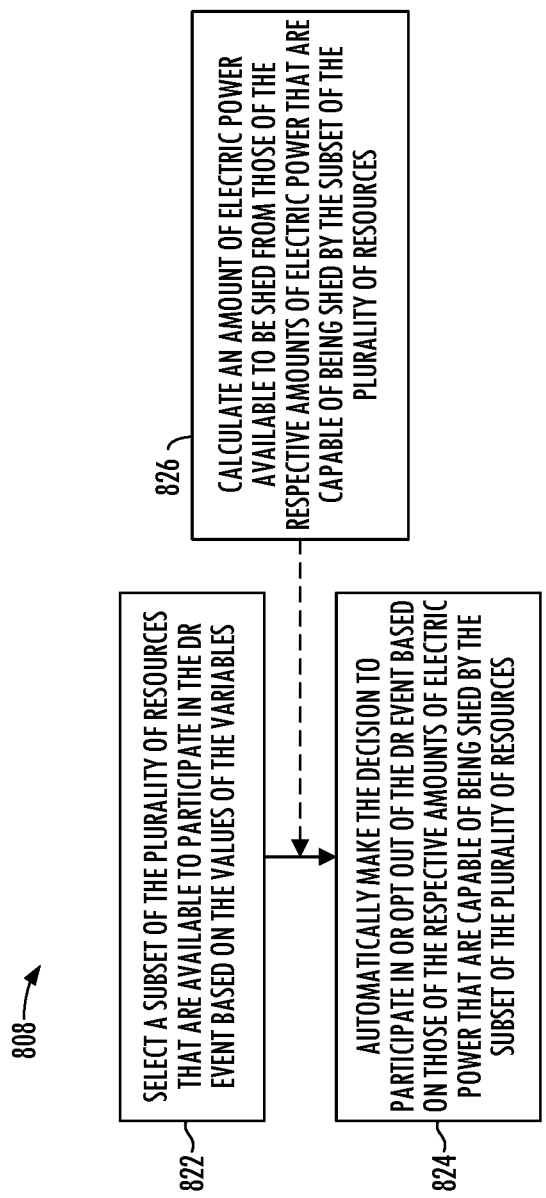

In some examples, automatically notifying the operator 102 at block 810 includes identifying a number of decisions previously made to opt out of prior DR events, as shown at block 814 of FIG. 8B. A load-facility operator 216 is notified when the number of decisions matches or exceeds an allotted number for the load facility 106, and confirmation of the decision is received from the load-facility operator, as shown at blocks 816 and 818. In some of these examples, the operator is automatically notified of the decision only after the decision is confirmed, as shown at block 820.

In some examples, the load facility 106 includes a plurality of resources with respective amounts of electric power that are capable of being shed by the plurality of resources during the DR event. In some of these examples, applying the values to the algorithm at block 808 includes selecting a subset of the plurality of resources that are available to participate in the DR event for the specified time interval based on the values of the variables, as shown at block 822 of FIG. 8C. Also in some of these examples, the decision to participate in or opt out of the DR event for the specified time interval is automatically made based on those of the respective amounts of electric power that are capable of being shed by the subset of the plurality of resources, as shown at block 824.

In some examples, selecting the subset of the plurality of resources at block 822 includes selecting one or more but less than all of the plurality of resources.

In some examples, the DR event has an associated load shed, and applying the values to the algorithm at block 808 further includes calculating an amount of electric power available to be shed by the load facility 106 from those of the respective amounts of electric power that are capable of being shed by the subset of the plurality of resources, as shown at block 826. In some of these examples, the decision is automatically made based on a comparison of the amount of electric power available to be shed by the load facility and the associated load shed for the DR event, as shown at block 824.

Figure 8D:
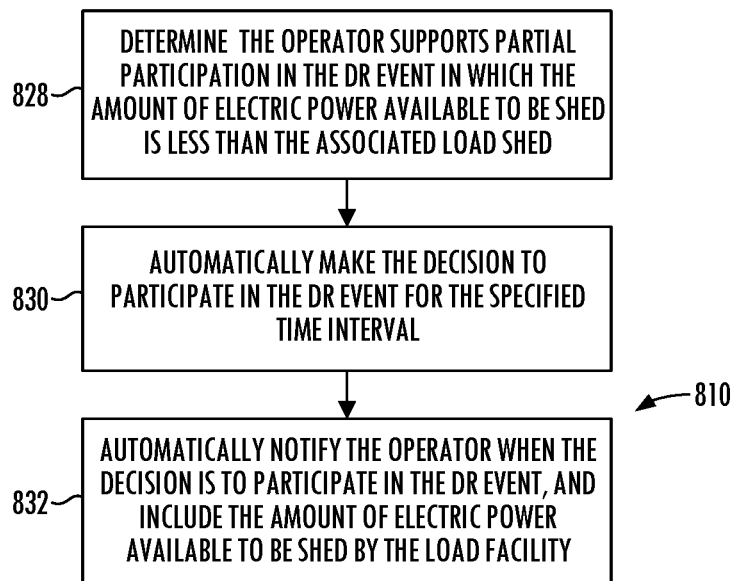

In some examples, automatically making the decision at block 824 includes determining the operator 102 supports partial participation in the DR event in which the amount of electric power available to be shed by the load facility 106 is less than the associated load shed for the DR event, as shown at block 828 of FIG. 8D. The decision is automatically made to participate in the DR event for the specified time interval, as shown at block 830. The operator is automatically notified at block 810 of the decision to participate in the DR event, and the automatic notification includes the amount of electric power available to be shed by the load facility, as shown at block 832.

According to example implementations of the present disclosure, components of the ICS 114 including the SCU 202, the field connection units 204 including the PLCs 210 and RTUs 212, and the terminal 214 may be implemented by various means. Means for implementing these components may include hardware, alone or under direction of one or more computer programs from a computer-readable storage medium. In some examples, one or more apparatuses may be configured to function as or otherwise implement one or more of the components shown and described herein. In examples involving more than one apparatus, the respective apparatuses may be connected to or otherwise in communication with one another in a number of different manners, such as directly or indirectly via a wired or wireless network or the like.

Figure 9:
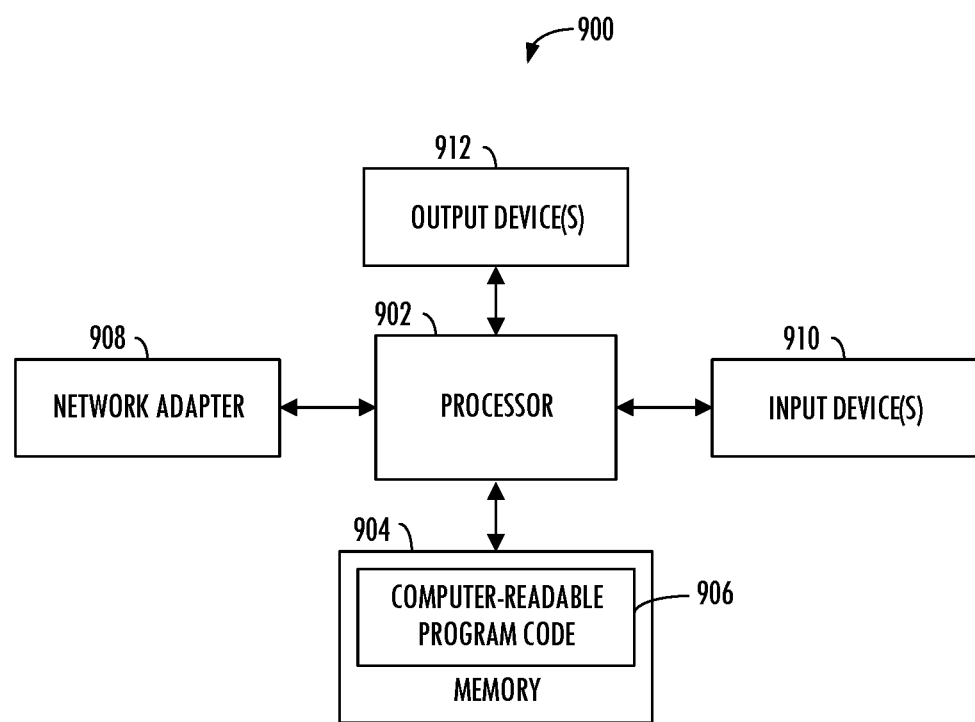
FIG. 9 illustrates an apparatus according to some example implementations.

FIG. 9 illustrates an apparatus 900 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer, PLC, circuit board or the like. The apparatus may include one or more of each of a number of components such as, for example, a processor 902 connected to a memory 904.

The processor 902 is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor may be a number of processors, a multi-core processor or some other type of processor, depending on the particular implementation.

The processor 902 may be configured to execute computer programs such as computer-readable program code 906, which may be stored onboard the processor or otherwise stored in the memory 904. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 904 is generally any piece of computer hardware capable of storing information such as, for example, data, computer-readable program code 906 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 902, causes the apparatus 900 to perform various operations as described herein, some of which may in turn cause the electrical equipment 112 to perform various operations.

In addition to the memory 904, the processor 902 may also be connected to one or more peripherals such as a network adapter 908, one or more input/output (I/O) devices or the like. The network adapter is a hardware component configured to connect the apparatus 900 to one or more networks to enable the apparatus to transmit and/or receive information via the one or more networks. This may include transmission and/or reception of information via one or more networks through a wired or wireless connection using Wi-Fi, Bluetooth, BACnet, LonTalk, Modbus, ZigBee, Zwave, or the like, or other suitable wired or wireless communication protocols.

The I/O devices may include one or more input devices 910 capable of receiving data or instructions for the apparatus 900, and/or one or more output devices 912 capable of providing an output from the apparatus. Examples of suitable input devices include a keyboard, keypad or the like, and examples of suitable output devices include a display device such as a one or more light-emitting, diodes (LEDs), a LED display, a liquid crystal display (LCD), or the like.

As explained above and reiterated below, the present disclosure includes, without limitation, the following example implementations.

Clause 1. An apparatus for controlling electrical load on a power grid from a load facility using demand response, the load facility including a plurality of resources with respective amounts of electric power that are capable of being shed by the plurality of resources during a demand-response (DR) event, the apparatus comprising: a memory configured to store computer-readable program code for decision analysis of a specified time interval for the DR event; and a processor configured to access the memory, and execute the computer-readable program code to cause the apparatus to at least make a decision to participate in or opt out of the DR event, including the apparatus caused to at least: access values of variables that describe occupancy and usage of the load facility for one or more time intervals, the variables correlated with the electrical load of the load facility for the one or more time intervals; select a subset of the plurality of resources that are available to participate in the DR event for the specified time interval based on the values of the variables; and control the electrical load of the load facility for the specified time interval based on the subset of the plurality of resources.

Clause 2. The apparatus of clause 1, wherein the apparatus is caused to select the subset of the plurality of resources includes the apparatus caused to select one or more but less than all of the plurality of resources.

Clause 3. The apparatus of clause 1 or clause 2, wherein the apparatus caused to select the subset of the plurality of resources includes the apparatus caused to apply the values to an algorithm that maps the variables to the subset of the plurality of resources that are selected.

Clause 4. The apparatus of clause 3, wherein the values are applied to the algorithm that is implemented as a stochastic algorithm.

Clause 5. The apparatus of clause 3 or clause 4, wherein the values are applied to the algorithm that is implemented as a deterministic algorithm.

Clause 6. The apparatus of any of clauses 1 to 5, wherein the specified time interval includes a plurality of time subintervals, and the apparatus caused to make the decision further includes the apparatus caused to produce a resource-availability schedule that identifies the subset of the plurality of resources for the specified time period subinterval by subinterval, and wherein the apparatus caused to control the electrical load includes the apparatus caused to control the electrical load for the specified time interval based on the resource-availability schedule.

Clause 7. The apparatus of clause 3, wherein the apparatus caused to make the decision further includes the apparatus caused to at least: produce a second resource-availability schedule for a second specified time interval after the specified time interval, the second resource-availability schedule including a prediction of the subset of the plurality of resources for the second time interval, the prediction made based on the resource-availability schedule; adjust the second resource-availability schedule responsive to user input; and control the electrical load for the second specified time interval based on the second resource-availability schedule.

Clause 8. The apparatus of clause 16, wherein the apparatus caused to make the decision further includes the apparatus caused to at least: produce further resource-availability schedules for further specified time intervals after the second specified time interval, the further resource-availability schedules including respective predictions of the subset of the plurality of resources for the further specified time intervals, the respective predictions made based on earlier resource-availability schedules as adjusted responsive to user input; and control the electrical load for the further specified time intervals based on the further resource-availability schedules.

Clause 9. The apparatus of any of clauses 1 to 8, wherein the DR event has an associated load shed, and the apparatus caused to control the electrical load of the load facility includes the apparatus caused to at least: calculate an amount of electric power available to be shed by the load facility during the DR event from those of the respective amounts of electric power for the subset of the plurality of resources; make a decision to participate in or opt out of the DR event for the time interval based on a comparison of the amount of electric power available to be shed and the associated load shed for the DR event; and notify an operator responsible for the DR event of the decision at least when the decision is to opt out.

Clause 10. A method of controlling electrical load on a power grid from a load facility using demand response, the load facility including a plurality of resources with respective amounts of electric power that are capable of being shed by the plurality of resources during a demand-response (DR) event; the method comprising: accessing memory storing computer-readable program code for decision analysis of a specified time interval for the DR event; and executing the computer-readable program code, via a processor, to cause an apparatus to at least make a decision to participate in or opt out of the DR event, including the apparatus at least: accessing values of variables that describe occupancy and usage of the load facility for one or more time intervals, the variables correlated with the electrical load of the load facility for the one or more time intervals; selecting a subset of the plurality of resources that are available to participate in the DR event for the specified time interval based on the values of the variables; and controlling the electrical load of the load facility for the specified time interval based on the subset of the plurality of resources.

Clause 11. The method of clause 1, wherein selecting the subset of the plurality of resources includes selecting one or more but less than all of the plurality of resources.

Clause 12. The method of clause 1 or clause ii, wherein selecting the subset of the plurality of resources includes applying the values to an algorithm that maps the variables to the subset of the plurality of resources that are selected.

Clause 13. The method of clause 3, wherein the values are applied to the algorithm that is implemented as a stochastic algorithm.

Clause 14. The method of clause 3 or clause 13, wherein the values are applied to the algorithm that is implemented as a deterministic algorithm.

Clause 15. The method of any of clauses 1 to 14, wherein the specified time interval includes a plurality of time subintervals, and the apparatus caused to make the decision further includes the apparatus producing a resource-availability schedule that identifies the subset of the plurality of resources for the specified time period subinterval by subinterval, and wherein controlling the electrical load includes controlling the electrical load for the specified time interval based on the resource-availability schedule.

Clause 16. The method of clause 15, wherein the apparatus caused to make the decision further includes the apparatus at least: producing a second resource-availability schedule for a second specified time interval after the specified time interval, the second resource-availability schedule including a prediction of the subset of the plurality of resources for the second time interval, the prediction made based on the resource-availability schedule; adjusting the second resource-availability schedule responsive to user input; and controlling the electrical load for the second specified time interval based on the second resource-availability schedule.

Clause 17. The method of clause 16, wherein the apparatus caused to make the decision further includes the apparatus at least: producing further resource-availability schedules for further specified time intervals after the second specified time interval, the further resource-availability schedules including respective predictions of the subset of the plurality of resources for the further specified time intervals, the respective predictions made based on earlier resource-availability schedules as adjusted responsive to user input; and controlling the electrical load for the further specified time intervals based on the further resource-availability schedules.

Clause 18. The method of any of clauses 1 to 17, wherein the DR event has an associated load shed, and controlling the electrical load of the load facility includes at least: calculating an amount of electric power available to be shed by the load facility, during the DR event from those of the respective amounts of electric power for the subset of the plurality of resources; making a decision to participate in or opt out of the DR event for the time interval based on a comparison of the amount of electric power available to be shed and the associated load shed for the DR event; and notifying an operator responsible for the DR event of the decision at least when the decision is to opt out.

Clause 19. An apparatus for controlling electrical load on a power grid from a load facility using demand response, the apparatus comprising: a memory configured to store computer-readable program code for decision analysis of a specified time interval for a demand-response (DR) event; and a processor configured to access the memory, and execute the computer-readable program code to cause the apparatus to at least make a decision to participate in or opt out of the DR event, including the apparatus at least: receive values of variables that describe occupancy and usage of the load facility for one or more time intervals, the variables correlated with the electrical load of the load facility for the one or more time intervals; apply the values to an algorithm that maps the variables to a decision to participate in or opt out of the DR event for the specified time interval; and automatically notify an operator responsible for the DR event of the decision at least when the decision is to opt out.

Clause 20. The apparatus of clause 19, wherein the apparatus is caused to receive the values of the variables that further describe weather at a location of the load facility for the one or more time intervals.

Clause 21. The apparatus of clause 19, wherein the values are applied to the algorithm that is implemented as a stochastic algorithm.

Clause 22. The apparatus of clause 19 or clause 21, wherein the values are applied to the algorithm that is implemented as a deterministic algorithm.

Clause 23. The apparatus of any of clauses 19 to 22, wherein the processor is configured to execute the computer-readable program code to cause the apparatus to further receive a request to participate in the DR event from the operator, and the apparatus is caused to automatically notify the operator in response to the request.

Clause 24. The apparatus of any of clauses 19 to 23, wherein the values include at least one of observed values for one or more prior time intervals that are prior to the specified time interval, or predicted values for the specified time interval.

Clause 25. The apparatus of clause 24, wherein the apparatus is caused to receive the values of the variables that further describe weather at a location of the load facility for the one or more time intervals, and wherein the values include the observed values and the predicted values of the variables that describe the occupancy and usage of the load facility, and that further describe the weather at the location of the facility, for the one or more prior time intervals and the specified time interval.

Clause 26. The apparatus of clause 24 or clause 25, wherein the values include the observed values, the variables further describe decisions previously made to participate in or opt out of any prior DR events during the one or more time intervals, and the observed values are applied to the algorithm that further maps the variables to a prediction of the DR event, and wherein the apparatus is caused to automatically notify the operator responsive to the prediction, and independent of a request from the operator to participate in the DR event.

Clause 27. The apparatus of any of clauses 19 to 26, wherein the apparatus caused to automatically notify the operator includes the apparatus caused to at least: identify a number of decisions previously made to opt out of prior DR events; notify a load-facility operator when the number of decisions matches or exceeds an allotted number for the load facility; receive confirmation of the decision from the load-facility operator; and automatically notify the operator only after the decision is confirmed.

Clause 28. The apparatus of any of clauses 19 to 27, wherein the load facility includes a plurality of resources with respective amounts of electric power that are capable of being shed by the plurality of resources during the DR event, and the apparatus caused to apply the values to the algorithm includes the apparatus caused to at least: select a subset of the plurality of resources that are available to participate in the DR event for the specified time interval based on the values of the variables; and automatically make the decision to participate in or opt out of the DR event for the specified time interval based on those of the respective amounts of electric power that are capable of being shed by the subset of the plurality of resources.

Clause 29. The apparatus of clause 28, wherein the apparatus caused to select the subset of the plurality of resources includes the apparatus caused to select one or more but less than all of the plurality of resources.

Clause 30. The apparatus of clause 28 or clause 29, wherein the DR event has an associated load shed, and the apparatus caused to apply the values to the algorithm further includes the apparatus caused to calculate an amount of electric power available to be shed by the load facility from those of the respective amounts of electric power that are capable of being shed by the subset of the plurality of resources, and wherein the apparatus is caused to automatically make the decision based on a comparison of the amount of electric power available to be shed by the load facility and the associated load shed for the DR event.

Clause 31. The apparatus of clause 30, wherein the apparatus caused to automatically make the decision includes the apparatus caused to at least: determine the operator supports partial participation in the DR event in which the amount of electric power available to be shed by the load facility is less than the associated load shed for the DR event; and automatically make the decision to participate in the DR event for the specified time interval, and wherein the apparatus is caused to automatically notify the operator of the decision to participate in the DR event, and including the amount of electric power available to be shed by the load facility.

Clause 32. A method of controlling electrical load on a power grid from a load facility using demand response, the method comprising: accessing memory storing computer-readable program code for decision analysis of a specified time interval for a demand-response (DR) event; and executing the computer-readable program code, via a processor, to cause an apparatus to at least make a decision to participate in or opt out of the DR event, including the apparatus at least: receiving values of variables that describe occupancy and usage of the load facility for one or more time intervals, the variables correlated with the electrical load of the load facility for the one or more time intervals; applying the values to an algorithm that maps the variables to a decision to participate in or opt out of the DR event for the specified time interval; and automatically notifying an operator responsible for the DR event of the decision at least when the decision is to opt out.

Clause 33. The method of clause 32, wherein receiving the values of the variables includes receiving the values of the variables that further describe weather at a location of the load facility for the one or more time intervals.

Clause 34. The method of clause 32 or clause 33, wherein the values are applied to the algorithm that is implemented as a stochastic algorithm.

Clause 35. The method of any of clauses 32 to 34, wherein the values are applied to the algorithm that is implemented as a deterministic algorithm.

Clause 36. The method of any of clauses 32 to 35, wherein the method further comprises receiving a request to participate in the DR event from the operator, and automatically notifying the operator includes automatically notifying the operator in response to the request.

Clause 37. The method of any of clauses 32 to 36, wherein the values include at least one of observed values for one or more prior time intervals that are prior to the specified time interval, or predicted values for the specified time interval.

Clause 38. The method of clause 37, wherein receiving the values of the variables includes receiving the values of the variables that further describe weather at a location of the load facility for the one or more time intervals, and wherein the values include the observed values and the predicted values of the variables that describe the occupancy and usage of the load facility, and that further describe the weather at the location of the facility, for the one or more prior time intervals and the specified time interval.

Clause 39. The method of clause 37 or clause 38, wherein the values include the observed values, the variables further describe decisions previously made to participate in or opt out of any prior DR events during the one or more time intervals, and the observed values are applied to the algorithm that further maps the variables to a prediction of the DR event, and wherein automatically notifying the operator includes automatically notifying the operator responsive to the prediction, and independent of a request from the operator to participate in the DR event.

Clause 40. The method of any of clauses 32 to 39, wherein automatically notifying the operator includes at least: identifying a number of decisions previously made to opt out of prior DR events; notifying a load-facility operator when the number of decisions matches or exceeds an allotted number for the load facility; receiving confirmation of the decision from the load-facility operator; and automatically notifying the operator only after the decision is confirmed.

Clause 41. The method of any of clauses 32 to 40, wherein the load facility includes a plurality of resources with respective amounts of electric power that are capable of being shed by the plurality of resources during the DR event, and applying the values to the algorithm includes at least: selecting a subset of the plurality of resources that are available to participate in the DR event for the specified time interval based on the values of the variables; and automatically making the decision to participate in or opt out of the DR event for the specified time interval based on those of the respective amounts of electric power that are capable of being shed by the subset of the plurality of resources.

Clause 42. The method of clause 41, wherein selecting the subset of the plurality of resources includes selecting one or more but less than all of the plurality of resources.

Clause 43. The method of clause 41, wherein the DR event has an associated load shed, and applying the values to the algorithm further includes calculating an amount of electric power available to be shed by the load facility from those of the respective amounts of electric power that are capable of being shed by the subset of the plurality of resources, and wherein automatically making the decision includes automatically making the decision based on a comparison of the amount of electric power available to be shed by the load facility and the associated load shed for the DR event.

Clause 44. The method of clause 43, wherein automatically making the decision includes at least: determining the operator supports partial participation in the DR event in which the amount of electric power available to be shed by the load facility is less than the associated load shed for the DR event; and automatically making the decision to participate in the DR event for the specified time interval, and wherein automatically notifying the operator includes automatically notifying the operator of the decision to participate in the DR event, and including the amount of electric power available to be shed by the load facility.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for controlling electrical load on a power grid from a load facility using demand response, the apparatus comprising:
   a memory configured to store computer-readable program code for decision analysis of a specified time interval for a demand-response (DR) event; and
   a processor configured to access the memory, and execute the computer-readable program code to cause the apparatus to at least make a decision to participate in or opt out of the DR event, including the apparatus at least:
   receive values of variables that describe occupancy and usage of the load facility for one or more time intervals, the variables correlated with the electrical load of the load facility for the one or more time intervals, wherein
   the load facility includes a plurality of resources with respective amounts of electric power that are capable of being shed by the plurality of resources during the DR event;
   apply the values to an algorithm that maps the variables to the decision to participate in or opt out of the DR event for the specified time interval, wherein
   the apparatus caused to apply the values to the algorithm includes the apparatus caused to at least select a subset of the plurality of resources that are available to participate in the DR event for the specified time interval based on the values of the variables, and
   automatically make the decision to participate in or opt out of the DR event for the specified time interval based on those of the respective amounts of electric power that are capable of being shed by the subset of the plurality of resources; and
   automatically notify an operator responsible for the DR event of the decision at least when the decision is to opt out.

2. The apparatus of claim 1, wherein the apparatus is caused to receive the values of the variables that further describe weather at a location of the load facility for the one or more time intervals.

3. The apparatus of claim 1, wherein the processor is configured to execute the computer-readable program code to cause the apparatus to further receive a request to participate in the DR event from the operator, and the apparatus is caused to automatically notify the operator in response to the request.

4. The apparatus of claim 1, wherein the values include at least one of observed values for one or more prior time intervals that are prior to the specified time interval, or predicted values for the specified time interval.

5. The apparatus of claim 4, wherein
the apparatus is caused to receive the values of the variables that further describe weather at a location of the load facility for the one or more time intervals and
the values include the observed values and the predicted values of the variables that describe the occupancy and usage of the load facility, and that further describe the weather at the location of the facility, for the one or more prior time intervals and the specified time interval.

6. The apparatus of claim 4, wherein
the values include the observed values, the variables further describe decisions previously made to participate in or opt out of any prior DR events during the one or more time intervals, and the observed values are applied to the algorithm that further maps the variables to a prediction of the DR event and
the apparatus is caused to automatically notify the operator responsive to the prediction, and independent of a request from the operator to participate in the DR event.

7. The apparatus of claim 1, wherein the apparatus caused to automatically notify the operator includes the apparatus caused to at least:

identify a number of decisions previously made to opt out of prior DR events;
notify a load-facility operator when the number of decisions matches or exceeds an allotted number for the load facility;
receive confirmation of the decision from the load-facility operator; and
automatically notify the operator only after the decision is confirmed.

8. The apparatus of claim 1, wherein
the DR event has an associated load shed, and the apparatus caused to apply the values to the algorithm further includes the apparatus caused to calculate an amount of electric power available to be shed by the load facility from those of the respective amounts of electric power that are capable of being shed by the subset of the plurality of resources and
the apparatus is caused to automatically make the decision based on a comparison of the amount of electric power available to be shed by the load facility and the associated load shed for the DR event.

9. The apparatus of claim 8, wherein the apparatus caused to automatically make the decision includes the apparatus caused to at least:
determine the operator supports partial participation in the DR event in which the amount of electric power available to be shed by the load facility is less than the associated load shed for the DR event; and
automatically make the decision to participate in the DR event for the specified time interval, and
wherein the apparatus is caused to automatically notify the operator of the decision to participate in the DR event, and including the amount of electric power available to be shed by the load facility.

10. A method of controlling electrical load on a power grid from a load facility using demand response, the method comprising:
accessing memory storing computer-readable program code for decision analysis of a specified time interval for a demand-response (DR) event; and
executing the computer-readable program code, via a processor, to cause an apparatus to at least make a decision to participate in or opt out of the DR event, including the apparatus at least:
receiving values of variables that describe occupancy and usage of the load facility for one or more time intervals, the variables correlated with the electrical load of the load facility for the one or more time intervals, wherein
the load facility includes a plurality of resources with respective amounts of electric power that are capable of being shed by the plurality of resources during the DR event;
applying the values to an algorithm that maps the variables to the decision to participate in or opt out of the DR event for the specified time interval, wherein
the apparatus caused to apply the values to the algorithm includes the apparatus caused to at least select a subset of the plurality of resources that are available to participate in the DR event for the specified time interval based on the values of the variables, and
automatically make the decision to participate in or opt out of the DR event for the specified time interval based on those of the respective amounts of electric power that are capable of being shed by the subset of the plurality of resources; and
automatically notifying an operator responsible for the DR event of the decision at least when the decision is to opt out.

11. The method of claim 10, wherein receiving the values of the variables includes receiving the values of the variables that further describe weather at a location of the load facility for the one or more time intervals.

12. The method of claim 10, wherein the method further comprises receiving a request to participate in the DR event from the operator, and automatically notifying the operator includes automatically notifying the operator in response to the request.

13. The method of claim 10, wherein the values include at least one of observed values for one or more prior time intervals that are prior to the specified time interval, or predicted values for the specified time interval.

14. The method of claim 13, wherein
receiving the values of the variables includes receiving the values of the variables that further describe weather at a location of the load facility for the one or more time intervals, and
the values include the observed values and the predicted values of the variables that describe the occupancy and usage of the load facility, and that further describe the weather at the location of the facility, for the one or more prior time intervals and the specified time interval.

15. The method of claim 13, wherein
the values include the observed values,
the variables further describe decisions previously made to participate in or opt out of any prior DR events during the one or more time intervals,
the observed values are applied to the algorithm that further maps the variables to a prediction of the DR event, and
the automatically notifying the operator includes automatically notifying the operator responsive to the prediction, and independent of a request from the operator to participate in the DR event.

16. The method of claim 10, wherein the automatically notifying the operator includes at least:
identifying a number of decisions previously made to opt out of prior DR events;
notifying a load-facility operator when the number of decisions matches or exceeds an allotted number for the load facility;
receiving confirmation of the decision from the load-facility operator; and
automatically notifying the operator only after the decision is confirmed.

17. The method of claim 10, wherein
the DR event has an associated load shed, and applying the values to the algorithm further includes calculating an amount of electric power available to be shed by the load facility from those of the respective amounts of electric power that are capable of being shed by the subset of the plurality of resources, and
automatically making the decision includes automatically making the decision based on a comparison of the amount of electric power available to be shed by the load facility and the associated load shed for the DR event.

18. The method of claim 17, wherein automatically making the decision includes at least:

determining the operator supports partial participation in the DR event in which the amount of electric power available to be shed by the load facility is less than the associated load shed for the DR event; and
automatically making the decision to participate in the DR event for the specified time interval, and
wherein automatically notifying the operator includes automatically notifying the operator of the decision to participate in the DR event, and including the amount of electric power available to be shed by the load facility.

\* \* \* \* \*